US011137602B2

(12) United States Patent
Vallius et al.

(10) Patent No.: US 11,137,602 B2
(45) Date of Patent: Oct. 5, 2021

(54) PUPIL-EXPANDING DISPLAY DEVICE

(71) Applicant: Microsoft Technology Licensing, LLC, Redmond, WA (US)

(72) Inventors: Tuomas Heikki Sakari Vallius, Kirkland, WA (US); Richard Andrew Wall, Kirkland, WA (US); Dmitry Reshidko, Bellevue, WA (US); Heikki Juhana Hyvarinen, Kauniainen (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 15/963,769

(22) Filed: Apr. 26, 2018

(65) Prior Publication Data
US 2019/0204595 A1     Jul. 4, 2019

Related U.S. Application Data

(60) Provisional application No. 62/612,120, filed on Dec. 29, 2017.

(51) Int. Cl.
*G02B 27/01*     (2006.01)
*G02B 5/18*     (2006.01)
(Continued)

(52) U.S. Cl.
CPC .......... *G02B 27/0172* (2013.01); *G02B 5/18* (2013.01); *G02B 13/18* (2013.01);
(Continued)

(58) Field of Classification Search
CPC ........................ G02B 27/0081; G02B 27/4205; G02B 13/18; G02B 27/0172; G06T 19/006
See application file for complete search history.

(56) References Cited

U.S. PATENT DOCUMENTS 8,320,032 B2 *   11/2012    Levola ................. G02B 5/1814
359/13
9,400,395 B2 *   7/2016    Travers .............. G02B 27/4205
(Continued)

FOREIGN PATENT DOCUMENTS

WO     2011015843 A2     2/2011

OTHER PUBLICATIONS

"International Search Report and Written Opinion Issued in PCT Application No. PCT/US2018/063513", dated Mar. 21, 2019, 14 Pages.

*Primary Examiner* — Bao-Luan Q Le
(74) *Attorney, Agent, or Firm* — Alleman Hall Creasman & Tuttle LLP (57) ABSTRACT

Examples are disclosed that relate to a display device. One example provides a display device comprising a projector and a pre-expander optic configured to replicate an exit pupil of the projector in at least a first direction, the pre-expander optic comprising a plurality of spectrally-selective pupil-replicating elements to form at least two exit pupils at different spatial locations, each exit pupil being for a different spectral band. The display device further comprises a waveguide comprising at least two incoupling pupils, each incoupling pupil configured to receive light from a corresponding exit pupil of the pre-expander optic, and the waveguide configured to replicate each corresponding exit pupil in at least a second direction and output the light received toward an eyebox.

20 Claims, 8 Drawing Sheets

(51) Int. Cl.
  G02B 13/18 (2006.01)
  G02B 27/00 (2006.01)
  G02B 27/42 (2006.01)
  G02B 27/10 (2006.01)
  G06T 19/00 (2011.01)

(52) U.S. Cl.
  CPC ..... G02B 27/0081 (2013.01); G02B 27/4205 (2013.01); G02B 27/1086 (2013.01); G02B 27/42 (2013.01); G02B 2027/0123 (2013.01); G02B 2027/0125 (2013.01); G02B 2027/0174 (2013.01); G02B 2027/0178 (2013.01); G06T 19/006 (2013.01)

(56) References Cited

U.S. PATENT DOCUMENTS

| | | | | |
|---|---|---|---|---|
| 9,753,297 | B2 * | 9/2017 | Saarikko | G02B 27/0081 |
| 9,904,058 | B2 * | 2/2018 | Yeoh | G02B 6/0016 |
| 9,933,684 | B2 * | 4/2018 | Brown | G02F 1/29 |
| 9,958,682 | B1 * | 5/2018 | Moore | G02B 27/0172 |
| 10,393,930 | B2 * | 8/2019 | Tervo | G02B 27/0081 |
| 2006/0132914 | A1 * | 6/2006 | Weiss | G02B 5/32 359/462 |
| 2010/0214659 | A1 * | 8/2010 | Levola | G02B 5/1814 359/566 |
| 2013/0314789 | A1 * | 11/2013 | Saarikko | G02B 27/0081 359/489.07 |
| 2014/0140653 | A1 * | 5/2014 | Brown | G02B 6/0033 385/10 |
| 2014/0140654 | A1 * | 5/2014 | Brown | G02F 1/29 385/10 |
| 2014/0293434 | A1 | 10/2014 | Cheng et al. | |
| 2014/0300966 | A1 * | 10/2014 | Travers | G02B 27/4205 359/558 |
| 2016/0238845 | A1 | 8/2016 | Alexander et al. | |
| 2016/0327789 | A1 * | 11/2016 | Klug | G02B 27/0101 |
| 2017/0184848 | A1 | 6/2017 | Vallius | |
| 2017/0248790 | A1 * | 8/2017 | Cheng | G02B 6/0016 |
| 2017/0299860 | A1 * | 10/2017 | Wall | G02B 3/0062 |
| 2017/0322418 | A1 * | 11/2017 | Lin | H04N 13/349 |
| 2017/0329075 | A1 * | 11/2017 | Yeoh | G02B 6/0016 |
| 2017/0329140 | A1 * | 11/2017 | Yeoh | G02B 6/0016 |

* cited by examiner

PUPIL-EXPANDING DISPLAY DEVICE

CROSS REFERENCE TO RELATED APPLICATIONS

This application claims priority to U.S. Provisional Patent Application Ser. No. 62/612,120, filed Dec. 29, 2017, the entirety of which is incorporated herein by reference for all purposes.

BACKGROUND

A near-eye display device may deliver an image to a user's eye via a waveguide. In an augmented reality display device, such a waveguide may allow the simultaneous viewing of displayed imagery and a real-world background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to waveguide-based display devices that expand an exit pupil of a projector by utilizing spectrally-selective pupil expansion elements. One example provides a display device comprising a projector and a pre-expander optic configured to replicate an exit pupil of the projector in at least a first direction, the pre-expander optic comprising a plurality of spectrally-selective pupil-replicating elements to form at least two exit pupils at different spatial locations, each exit pupil comprising a different spectral band. The display device further comprises a waveguide including at least two incoupling pupils, each incoupling pupil configured to receive light from a corresponding exit pupil of the pre-expander optic, the waveguide being configured to replicate each corresponding exit pupil in at least a second direction and output the light received toward an eyebox.

DETAILED DESCRIPTION

An augmented reality display device may be configured to combine displayed virtual imagery with a view of a real-world background via a waveguide positioned in front of a user's field of view. However, designing an augmented reality system for full color display to a wide variety of users with different interpupillary sizes poses various issues. For example, to implement color display, some augmented reality display devices may use different waveguides to deliver different color subframes of an image. While "stacks" of spectrally-selective waveguides may deliver adequate color uniformity in a displayed image, stacked waveguides lead to larger form factors and higher manufacturing costs. The use of a common waveguide to deliver multiple color fields of images to a user's eye may allow for a more compact device than a waveguide stack and reduced costs. However, such waveguides may suffer degraded image quality compared to the use of a waveguide stack. For example, an input coupler (e.g. a grating) used to incouple light into the waveguide may not have uniform incoupling efficiency across the different color bands, and thus may generate nonuniformities in a displayed image.

Further, designing a near-eye display with a sufficiently large exit pupil to accommodate a wide variety of interpupillary sizes also poses challenges. For example, a projector used to produce an image in a near-eye display device may have a small exit pupil, which may result in vignetting when a user shifts his or her gaze. However, expanding an exit pupil produced by a small pupil projector will result in reducing a field of view, and vice versa. As another possible solution, a larger pupil projector may be used to increase an exit pupil size. However, this may increase the device size.

Accordingly, examples are disclosed of waveguide display systems that perform pupil replication for multiple wavelength bands using a common waveguide for the multiple wavelength bands. Briefly, the disclosed examples comprise a pre-expander optic that includes spectrally-selective elements configured to separate a projector exit pupil into spatially separated exit pupils for different spectral bands, and also to expand each exit pupil by pupil replication in a first direction. The disclosed examples further comprise a waveguide having spatially separated incoupling pupils corresponding to the exit pupils of the pre-expander optic, and spectrally selective structures for expanding the pupil for each spectral band in a second direction. In this manner, the combination of the pre-expander optic and waveguide may allow the delivery of color imagery from a small pupil projector to a sufficiently large eyebox for users having a wide range of interpupillary distances via a common waveguide for a plurality of color fields of an image.

Figure 1:
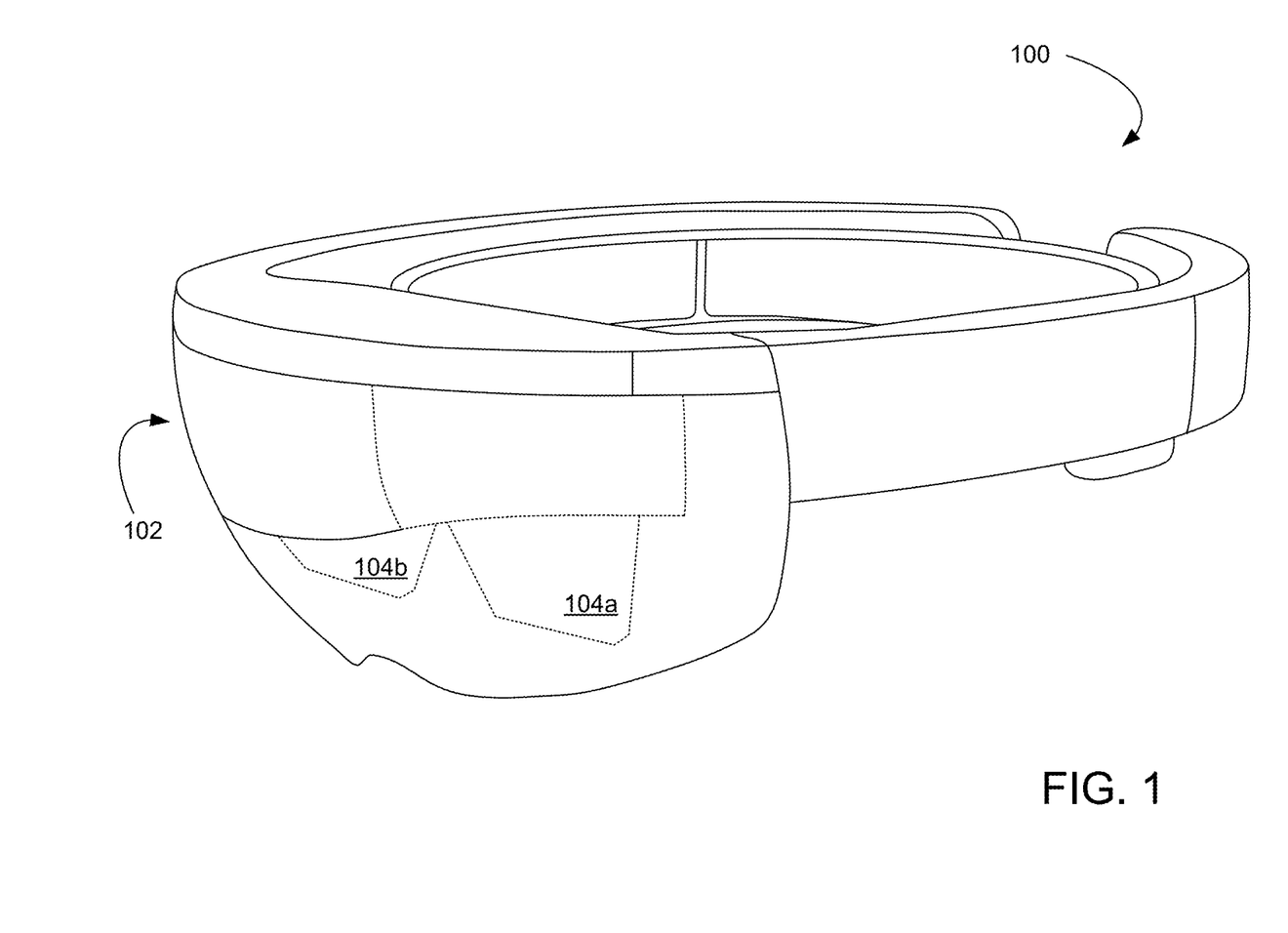
FIG. 1 shows an example head-mounted display system comprising a display device.

Prior to discussing these examples, FIG. 1 shows an example head-mounted display system 100 including a display device 102 positioned near a wearer's eyes. The display device 102 includes left-eye and right-eye displays 104a, 104b comprising see-through waveguides positioned to display virtual imagery in front of a view of a real-world environment for use in augmented and/or mixed reality applications. Although depicted as having separate left-eye and right-eye display panels in the example of FIG. 1, in other examples a display device may include a shared display panel extending over both eyes.

Figure 2:
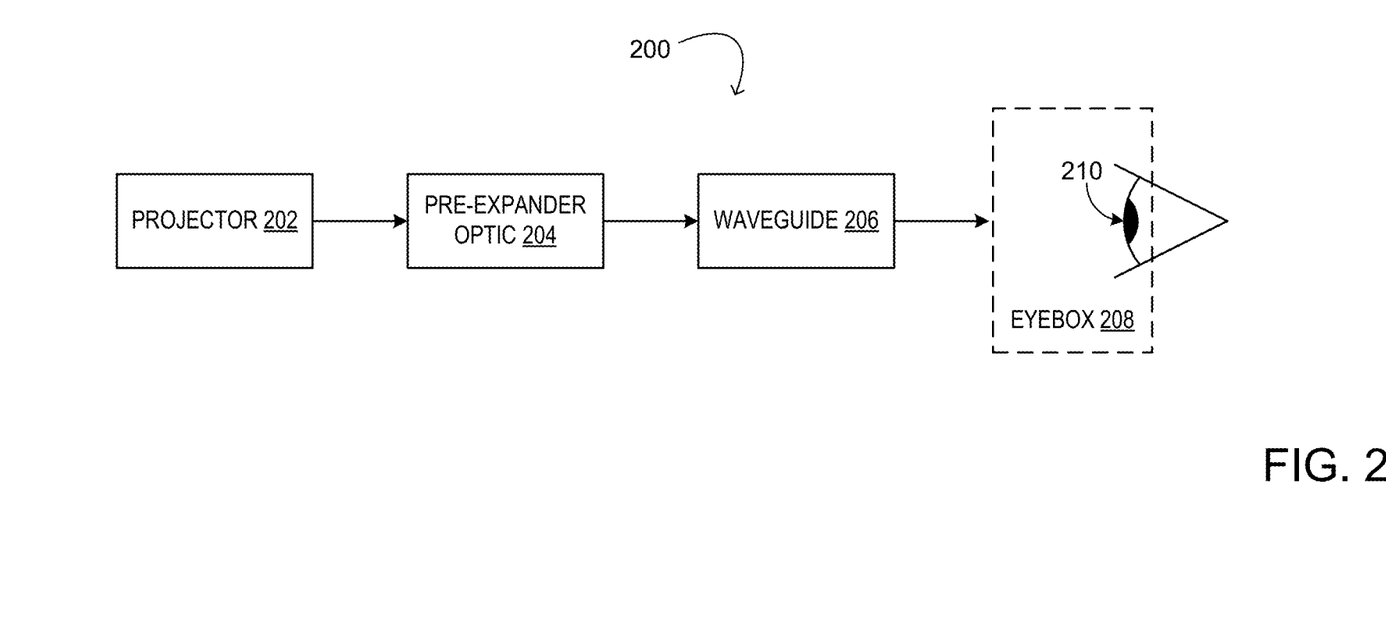
FIG. 2 shows a block diagram of an example display device.

FIG. 2 shows a block diagram of an example display device 200, which may be used as display device 102 of FIG. 1. Display device 200 includes a projector 202, a pre-expander optic 204, and a waveguide 206 to output images towards an eyebox 208 in which a user's pupil 210 may be positioned for viewing. The projector 202 may utilize any suitable image-forming device. In various examples, the projector 202 may comprise a liquid-crystal-on-silicon (LCOS) microdisplay, an organic light emitting device (OLED), or a scanning laser system. In some examples, each color field may utilize a separate image producing element (e.g. a separate LCOS or OLED), while in other examples a same image-forming device may be used to sequentially form different color fields in a time multiplexed manner. As such, in various examples, the projected light of different colors may be coupled into the pre-expander optic at different locations or a same location. It will be understood that display device 200 may include additional optical elements not depicted in FIG. 2.

The pre-expander optic comprises a plurality of spectrally-selective elements positioned at spatially different locations. As such, the pre-expander optic is configured to expand an exit pupil of the projector in at least a first direction to form at least two exit pupils at different spatial locations for different spectral bands of light. In some examples, the pre-expander optic is configured to expand the exit pupil of the projector via pupil replication.

Figure 3:
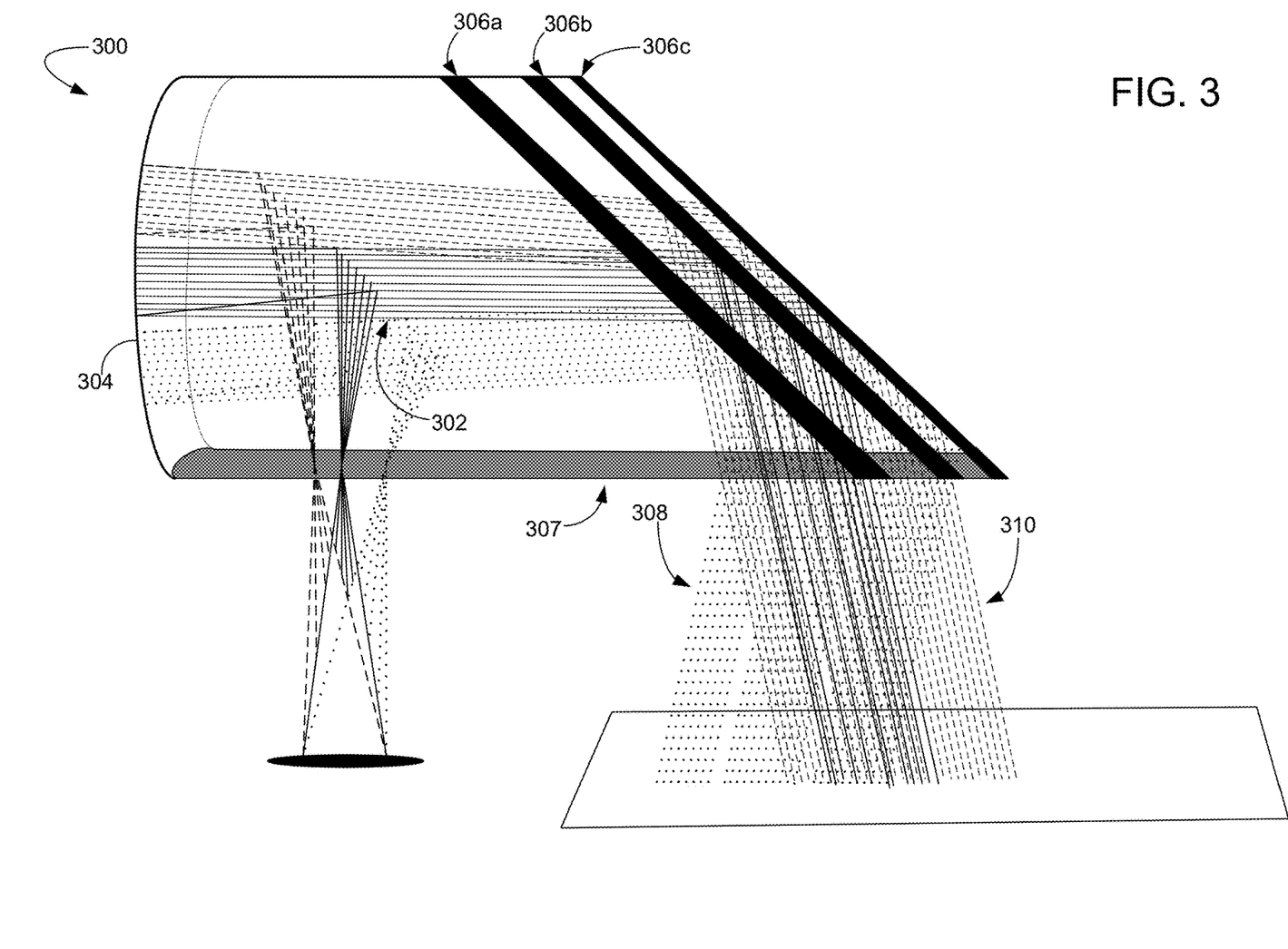
FIG. 3 shows an example pre-expander in the form of a cube.

FIG. 3 shows an example pre-expander optic 300 in the form of a cube. The term "cube" is used herein to distinguish the thicker prism-like structure of FIG. 3 from the thinner plate-like waveguide of FIGS. 4A-4B, and not to signify that the structure is cubic in geometry, as a "cube" pre-expander optic according to the present disclosure may have a variety of different configurations. In the depicted example, light entering the pre-expander optic 300 is directed by a polarizing beam splitter 302 (or other suitable beam splitter) toward a curved reflector 304. The curved reflector 304 redirects the light through the polarizing beam splitter 302 toward a plurality of spectrally-selective elements, shown as 306a, 306b and 306c.

The spectrally-selective elements 306a-c may comprise any suitable structures for replicating the exit pupil in a spectrally-selective manner. In this example, the spectrally-selective elements 306a-c take the form of three spectrally-selective mirrors (e.g. coated with different dichroic coatings) angled relative to an outcoupling surface 307 of the prism cube, wherein the three mirrors separate the light into a red exit pupil 308 and a green-blue exit pupil 310 at different spatial locations. In other examples, any other types of spectrally-selective elements than mirrors (e.g. diffractive and/or refractive optics) may be used to form any other suitable number of separate exit pupils for different spectral bands. Examples include gratings having different grating properties (e.g., fill factor, slant, depth).

The spectrally-selective elements may be configured to outcouple each pupil towards a corresponding incoupling pupil of a waveguide. As such, incoupling pupils of the waveguide receive light from corresponding exit pupils of the pre-expander optic at different spatial locations.

Figure 4A:
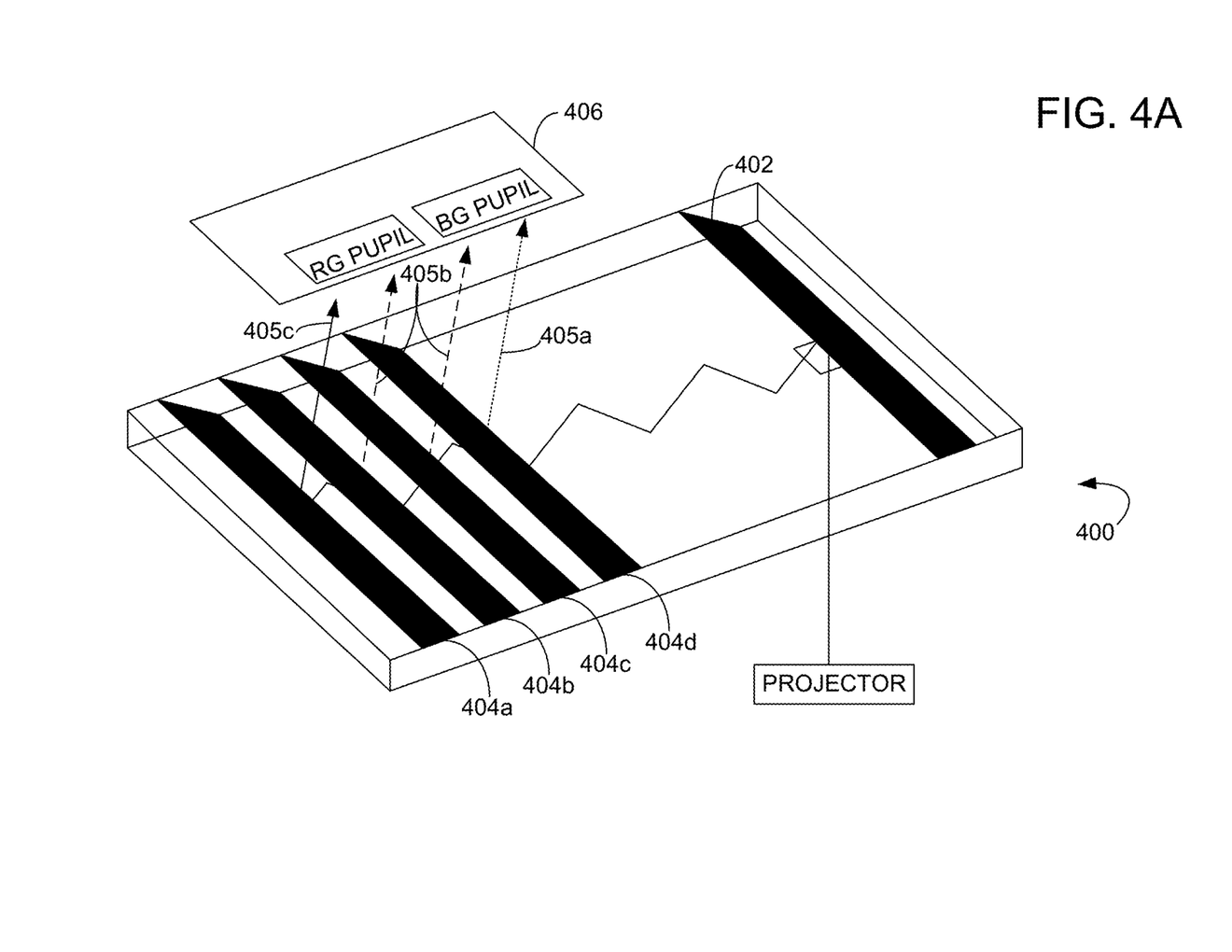
FIGS. 4A-4B show an example pre-expander in the form of a waveguide.
Figure 4B:
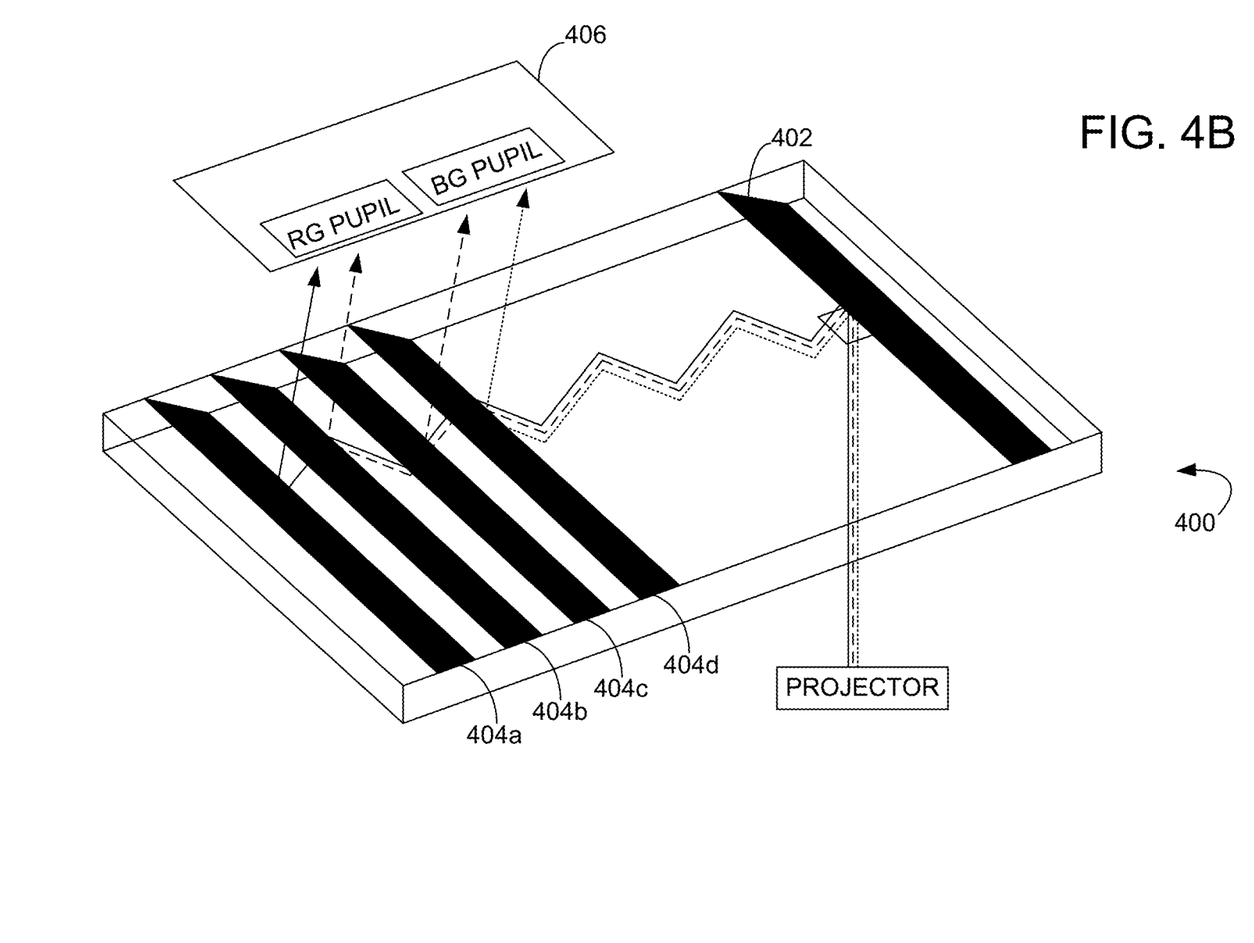

FIGS. 4A-4B depict another example pre-expander optic 400 in the form of a waveguide. Similar to the example of FIG. 3, different spectral bands of light entering the pre-expander optic 400 from a projector may be spatially separated (as shown in FIG. 4B) and/or coincident (as shown in FIG. 4A). Any suitable incoupling structure may be used to couple light emitted by the projector into the waveguide. In this example, a mirror 402 couples light into the pre-expander optic 400 such that the light propagates via total internal reflection towards spectrally-selective elements 404a, 404b, 404c, and 404d. In other examples, any other suitable incoupling structure may be used to couple light from a projector into the pre-expander optic.

In FIGS. 4A and 4B, the spectrally-selective elements 404a, 404b, 404c, and 404d comprise dichroic mirrors oriented at 45° with respect to the direction of light propagation. The mirrors separate the light into three different spectral bands 405a, 405b, 405c, and also replicate each pupil to form two spatially and spectrally separated expanded exit pupils. Light exiting the pre-expander 400 is directed toward two corresponding incoupling pupils of a waveguide 406. It will be understood that any type(s) of spectrally-selective elements other than or in addition to mirrors (e.g. diffractive and/or refractive optics) may be used to form any suitable number of expanded pupils.

Figure 5:
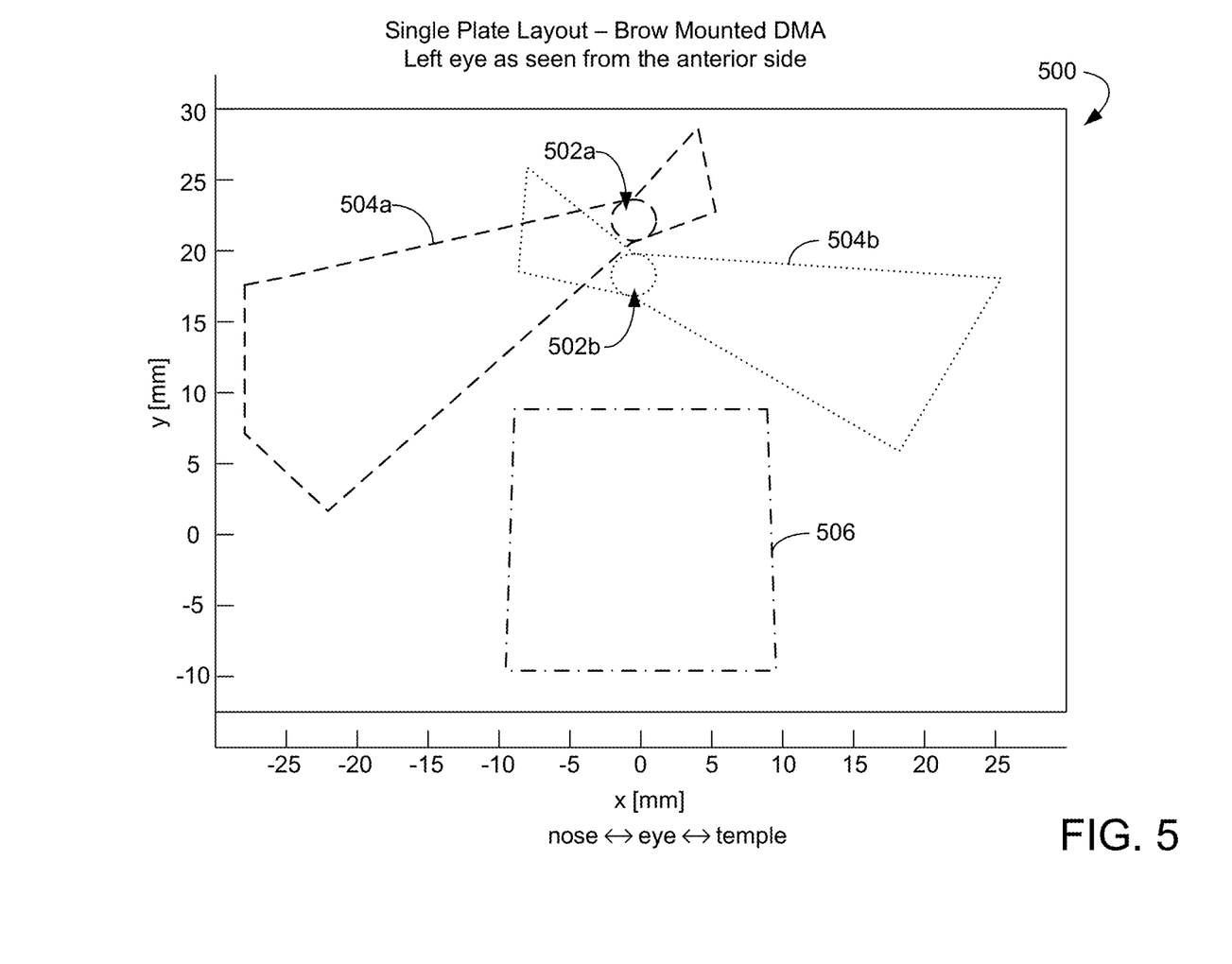
FIG. 5 schematically shows an example waveguide for a brow-mounted projector.
Figure 6:
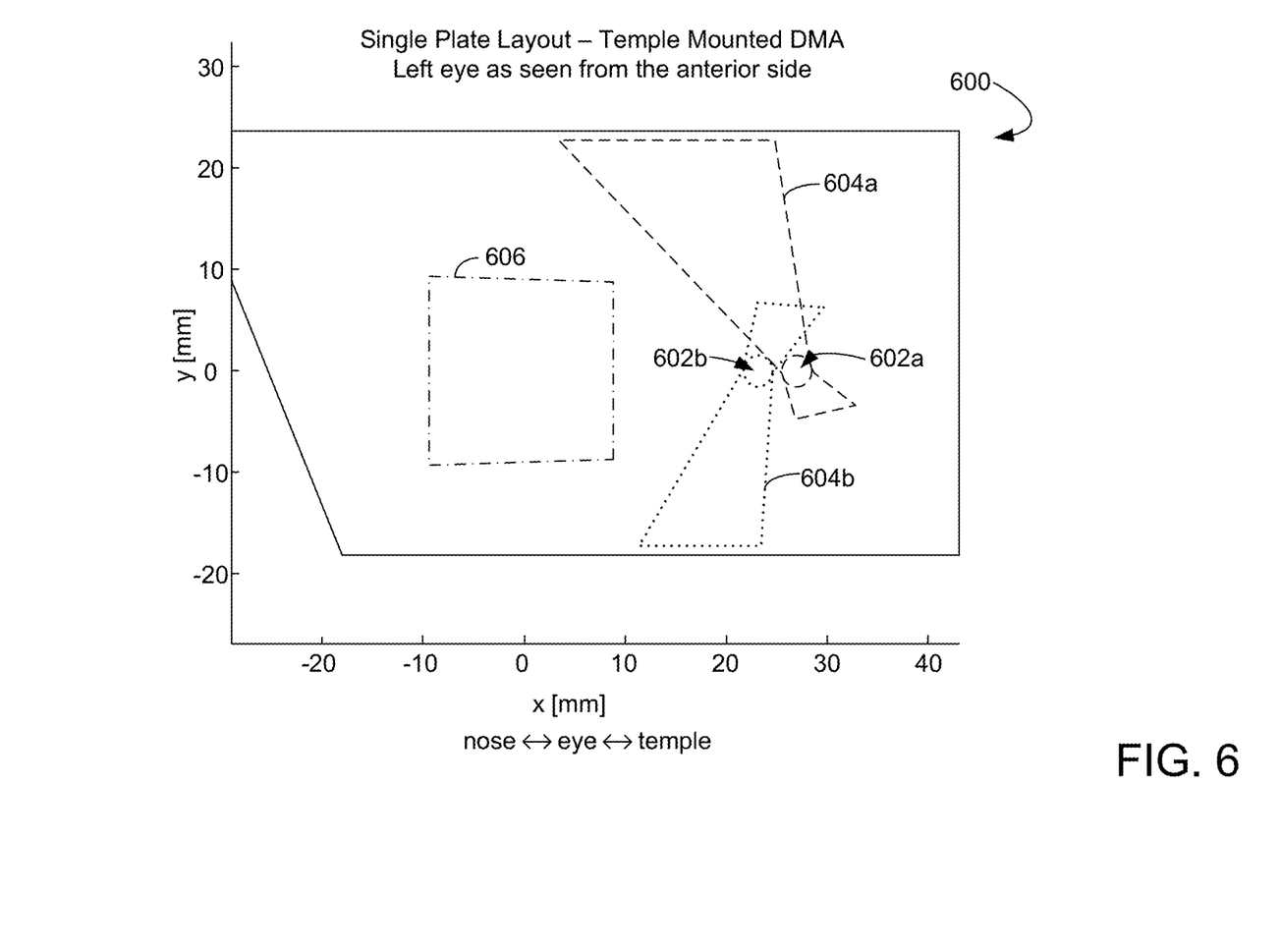
FIG. 6 schematically shows an example waveguide for a temple-mounted projector.

FIGS. 5 and 6 each schematically shows an example waveguide configuration as seen from an anterior side of a user's left eye. The example waveguide 500 depicted in FIG. 5 is configured for a system utilizing a brow-mounted projector, whereas the example waveguide 600 depicted in FIG. 6 is configured for a system utilizing a temple-mounted projector. As each waveguide 500, 600 is configured to be positioned at least partially in front of a user's field of view, the waveguide comprises an optically transparent material for transmitting external light.

Each of the example waveguide configurations 500, 600 depicted in FIGS. 5 and 6 includes two different incoupling pupils 502a-b, 602a-b at different spatial locations, as indicated by the dashed-line and dotted-line circles. In FIGS. 5-6, the dashed-line circle corresponds to an incoupling pupil 502a, 602a for red and green light, and the dotted-line circle corresponds to an incoupling pupil 502b, 602b for blue and green light. Such a waveguide is configured to receive light from a pre-expander optic having two exit pupils. In other examples, any other suitable number of incoupling pupils may be used for any suitable number of different spectral bands.

As each exit pupil of the pre-expander optic comprises a different spectral band, each incoupling pupil of the waveguide may comprise spectrally-selective diffraction gratings. This may help to improve incoupling efficiency compared to the use of a same incoupling grating for a broader range of wavelengths. In some examples, gratings may be dual-sided, which may further improve incoupling efficiency. Further, while depicted as being positioned at a central location relative to an axis of the waveguide 500, 600, each incoupling pupil may be positioned at any other suitable spatial location on the waveguide in other examples.

The waveguide is further configured to expand each corresponding exit pupil in at least a second direction and output the light received toward an eyebox. In some examples, the waveguide is configured to expand each corresponding exit pupil via pupil replication. To prevent color and/or angular nonuniformities in a displayed image, the waveguide includes a separate expansion structure for each pupil. As indicated in FIGS. 5-6, each expansion structure 504a-b, 604a-b may originate at a distal location of the waveguide 500, 600. While the examples of FIGS. 5-6 depict each expansion structure as spatially overlapping, each expansion structure may be non-overlapping, in other examples. Each expansion structure 504a-b, 604a-b may comprise one or more of a diffractive optical element, a reflective optical element, and a refractive optical element. Further, an expansion structure may include single-sided or dual-sided diffraction gratings. The use of dual-sided diffraction gratings may, in some examples, help to improve pupil replication. Each expansion structure 504a-b, 604a-b replicates the corresponding exit pupil in at least a second direction, thus maintaining field of view while expanding the pupil size for display.

The waveguide is further configured to outcouple light of each exit pupil toward an eyebox. For example, the dotted-and-dashed structures in FIGS. 5 and 6 show outcoupling structures 506, 606, each configured to outcouple light from both respective incoupling pupils 502*a-b*, 602*a-b* toward an eyebox.

Figure 7:
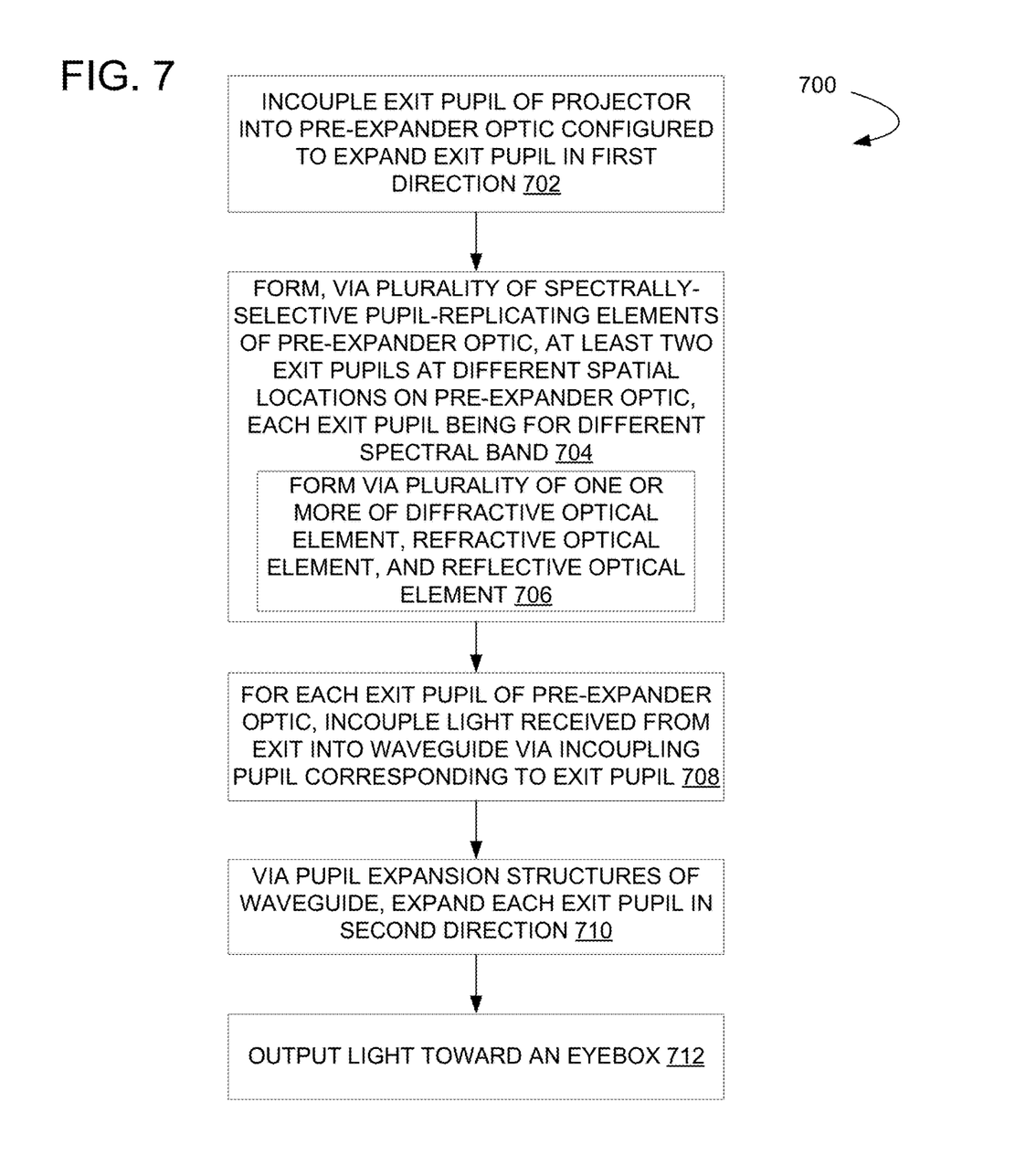
FIG. 7 is a flow diagram illustrating an example method for displaying an image.

FIG. 7 is a flow diagram illustrating an example method 700 of displaying an image. At 702, method 700 includes incoupling an exit pupil of a projector into a pre-expander optic configured to replicate the exit pupil in at least a first direction. Any suitable projector may be used to provide light to the pre-expander. Examples include a liquid-crystal-on-silicon (LCOS) microdisplay, an organic light emitting device (OLED), and a scanning laser system.

At 704, method 700 includes forming, via a plurality of spectrally-selective pupil-replicating elements of the pre-expander optic, at least two exit pupils at different spatial locations on the pre-expander optic, each exit pupil being for a different spectral band. The exit pupil may be formed via one or more of a diffractive optical element, a refractive optical element, and a reflective optical element, as indicated at 706. In one example, the pre-expander optic includes a plurality of dichroic mirrors arranged to form at least two exit pupils of different spectral bands at different spatial locations on the pre-expander optic.

For each exit pupil of the pre-expander optic, method 700 includes, at 708, coupling light received from the exit pupil into a waveguide via an incoupling pupil corresponding to the exit pupil. Any suitable structure may be used to couple light into the waveguide, including diffractive, refractive, and reflective structures. At 710, method 700 includes expanding each exit pupil in at least a second direction via pupil replicating structures of the waveguide. Further, at 712, method 700 includes outputting the light toward an eyebox after expanding each exit pupil in the second direction. Accordingly, method 700 may deliver color imagery from a small pupil projector to a sufficiently large eyebox for users having a wide range of interpupillary distances via a common waveguide for a plurality of color fields of the image.

Another example provides a display device, comprising a projector, a pre-expander optic configured to expand an exit pupil of the projector in at least a first direction, the pre-expander optic comprising a plurality of spectrally-selective elements to form at least two exit pupils at different spatial locations, each exit pupil being for a different spectral band, and a waveguide comprising at least two incoupling pupils, each incoupling pupil configured to receive light from a corresponding exit pupil of the pre-expander optic, and the waveguide configured to expand each corresponding exit pupil in at least a second direction and output the light received toward an eyebox. In such an example, the plurality of spectrally-selective elements may additionally or alternatively comprise one or more diffractive optical elements. In such an example, the plurality of spectrally-selective elements may additionally or alternatively comprise one or more refractive optical elements. In such an example, the plurality of spectrally-selective elements may additionally or alternatively comprise one or more reflective optical elements. In such an example, the pre-expander optic may be additionally or alternatively configured to expand the exit pupil of the projector via pupil replication. In such an example, the projector may additionally or alternatively comprise one or more of a liquid crystal on silicon display, an organic light emitting device, and a laser projector. In such an example, the pre-expander optic may be additionally or alternatively configured to form three exit pupils at three different spatial locations, and the waveguide may additionally or alternatively comprise three incoupling pupils. In such an example, the pre-expander optic may additionally or alternatively configured to form two exit pupils at two different spatial locations, and the waveguide may additionally or alternatively comprise two incoupling pupils. In such an example, the at least two incoupling pupils may additionally or alternatively comprise a red-green pupil and a blue-green pupil. In such an example, the display device may additionally or alternatively comprise a head-mounted display. In such an example, the waveguide may additionally or alternatively comprise, for each exit pupil of the pre-expander optic, an expansion structure for replicating the exit pupil in at least the second direction. In such an example, one or more of the expansion structures may additionally or alternatively comprise a diffractive grating.

Another example provides a method of displaying an image, the method comprising incoupling an exit pupil of a projector into a pre-expander optic configured to expand the exit pupil in at least a first direction, forming, via a plurality of spectrally-selective pupil-replicating elements of the pre-expander optic, at least two exit pupils at different spatial locations on the pre-expander optic, each exit pupil being for a different spectral band, for each exit pupil of the pre-expander optic, incoupling light received from the exit pupil of the pre-expander optic into a waveguide via an incoupling pupil corresponding to the exit pupil, via the waveguide, expanding each exit pupil in at least a second direction, and outputting the light received toward an eyebox. In such an example, forming the at least two exit pupils may additionally or alternatively comprise forming the at least two exit pupils via a plurality of one or more of a diffractive optical element, a refractive optical element, and a reflective optical element. In such an example, expanding each exit pupil in at least the second direction may additionally or alternatively comprise expanding each exit pupil via an expansion structure of the waveguide corresponding to the exit pupil. In such an example, expanding each exit pupil in at least the second direction may additionally or alternatively comprise expanding via pupil replication.

Another example provides a display device, comprising a projector, a first waveguide configured to expand an exit pupil of the projector in at least a first direction, the first waveguide comprising a plurality of spectrally-selective pupil-replicating elements configured to form at least two exit pupils at different spatial locations, each exit pupil being for a different spectral band, and a second waveguide configured to output light from the projector toward an eyebox, the second waveguide comprising at least two incoupling pupils each configured to receive light from a corresponding exit pupil of the first waveguide, and the second waveguide also comprising, for each exit pupil of the first waveguide, an expansion structure configured to expand the exit pupil in at least a second direction. In such an example, the at least two incoupling pupils of the second waveguide may be additionally or alternatively configured to receive light from corresponding exit pupils of the first waveguide at different spatial locations on the second waveguide. In such an example, the first waveguide may be additionally or alternatively configured to form two exit pupils at two different spatial locations, and the waveguide may additionally or alternatively comprise two incoupling pupils. In such an example, the two exit pupils of the first waveguide may additionally or alternatively comprise a red-green exit pupil and a green-blue exit pupil.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
 a projector;
 a pre-expander optic configured to expand an exit pupil of the projector in at least a first direction, the pre-expander optic comprising a plurality of spectrally-selective elements to form at least two exit pupils at different spatial locations, each exit pupil being for a different spectral band; and
 a waveguide comprising at least two incoupling pupils spatially separated along a plane of the waveguide, each incoupling pupil configured to receive light from a corresponding exit pupil of the pre-expander optic, and the waveguide configured to expand each corresponding exit pupil in at least a second direction and output the light received toward an eyebox.

2. The display device of claim 1, wherein the plurality of spectrally-selective elements comprises one or more diffractive optical elements.

3. The display device of claim 1, wherein the plurality of spectrally-selective elements comprises one or more refractive optical elements.

4. The display device of claim 1, wherein the plurality of spectrally-selective elements comprises one or more reflective optical elements.

5. The display device of claim 1, wherein the pre-expander optic is configured to expand the exit pupil of the projector via pupil replication.

6. The display device of claim 1, wherein the projector comprises one or more of a liquid crystal on silicon display, an organic light emitting device, and a laser projector.

7. The display device of claim 1, wherein the pre-expander optic is configured to form three exit pupils at three different spatial locations, and wherein the waveguide comprises three incoupling pupils.

8. The display device of claim 1, wherein the pre-expander optic is configured to form two exit pupils at two different spatial locations, and wherein the waveguide comprises two incoupling pupils.

9. The display device of claim 1, wherein the at least two incoupling pupils comprises a red-green pupil and a blue-green pupil.

10. The display device of claim 1, wherein the display device comprises a head-mounted display.

11. The display device of claim 1, wherein the waveguide comprises, for each exit pupil of the pre-expander optic, an expansion structure for replicating the exit pupil in at least the second direction.

12. The display device of claim 11, wherein one or more of the expansion structures comprises a diffractive grating.

13. A method of displaying an image, the method comprising:
 incoupling an exit pupil of a projector into a pre-expander optic configured to expand the exit pupil in at least a first direction;
 forming, via a plurality of spectrally-selective pupil-replicating elements of the pre-expander optic, at least two exit pupils at different spatial locations on the pre-expander optic, each exit pupil being for a different spectral band;
 for each exit pupil of the pre-expander optic, incoupling light received from the exit pupil of the pre-expander optic into a waveguide via an incoupling pupil corresponding to the exit pupil, the waveguide comprising at least two incoupling pupils spatially separated along a plane of the waveguide;
 via the waveguide, expanding each exit pupil in at least a second direction; and
 outputting the light received toward an eyebox.

14. The method of claim 13, wherein forming the at least two exit pupils comprises forming the at least two exit pupils via a plurality of one or more of a diffractive optical element, a refractive optical element, and a reflective optical element.

15. The method of claim 13, wherein expanding each exit pupil in at least the second direction comprises expanding each exit pupil via an expansion structure of the waveguide corresponding to the exit pupil.

16. The method of claim 13, wherein expanding each exit pupil in at least the second direction comprises expanding via pupil replication.

17. A display device, comprising:
 a projector;
 a first waveguide configured to expand an exit pupil of the projector in at least a first direction, the first waveguide comprising a plurality of spectrally-selective elements configured to form at least two exit pupils at different spatial locations, each exit pupil being for a different spectral band; and
 a second waveguide configured to output light from the projector toward an eyebox, the second waveguide comprising at least two incoupling pupils spatially separated along a plane of the second waveguide, each incoupling pupil configured to receive light from a corresponding exit pupil of the first waveguide, and the second waveguide also comprising, for each exit pupil of the first waveguide, an expansion structure configured to expand the exit pupil in at least a second direction.

18. The display device of claim 17, wherein the at least two incoupling pupils of the second waveguide are configured to receive light from corresponding exit pupils of the first waveguide at different spatial locations on an input surface of the second waveguide.

19. The display device of claim 17, wherein the first waveguide is configured to form two exit pupils at two different spatial locations, and wherein the second waveguide comprises two incoupling pupils.

20. The display device of claim 19, wherein the two exit pupils of the first waveguide comprise a red-green exit pupil and a green-blue exit pupil.

* * * * *